United States Patent [19]
Gibby

[11] Patent Number: 5,724,811
[45] Date of Patent: Mar. 10, 1998

[54] OPTIMIZED GAS-BASED TRANSMISSION

[76] Inventor: Dale Gibby, 399 Westland Dr., Brigham City, Utah 84302

[21] Appl. No.: 547,431

[22] Filed: Oct. 24, 1995

[51] Int. Cl.⁶ ............................................. F16D 39/00
[52] U.S. Cl. ...................... 60/409; 60/410; 60/412; 60/431
[58] Field of Search .................... 60/408, 409, 410, 60/412, 431

[56] References Cited

U.S. PATENT DOCUMENTS

| | | | |
|---|---|---|---|
| 685,704 | 10/1901 | Wilkinson | 60/410 |
| 859,235 | 7/1907 | Macfarren | 60/412 |
| 3,885,387 | 5/1975 | Simington | 60/412 |
| 4,123,910 | 11/1978 | Ellison | 60/412 |
| 4,124,978 | 11/1978 | Wagner | 60/410 |

*Primary Examiner*—F. Daniel Lopez
*Attorney, Agent, or Firm*—Thompson E. Fehr

[57] ABSTRACT

A gas-based transmission which has a self-regulating mechanical advantage that is continuously—and, essentially, infinitely variable. A high-pressure reservoir receives either exhaust gas from an engine or air from a compressor that is run by the drive shaft from an engine. A pressure regulator on the output of the high-pressure reservoir controls the engine resistance and decouples the engine from the the drive forces. The pressure can be set at a given level which will approximate the power curve for the engine or can be controlled by a computer so that the engine will produce the power desired by the operator at the lowest engine speed capable of producing such power, i.e., the engine will operate precisely on its power curve. The gas or air passes from the pressure regulator to a variable-pressure reservoir. The variable-pressure reservoir is connected to a gas-operated drive motor so that when the pressure within the variable-pressure reservoir has reached the precise level necessary for the gas-operated drive motor to operate against the existing drive force, the gas or air will begin leaving the variable-pressure reservoir and start rotating the drive shaft of the gas-operated drive motor. The gas or air can be directed through the gas-operated drive motor in a reverse direction to cause the drive shaft to turn in a reverse direction. Braking is accomplished by drawing air into the output of the gas-operated drive motor and conducting it to the high-pressure reservoir. Energy storage is also available.

19 Claims, 14 Drawing Sheets

OPTIMIZED GAS-BASED TRANSMISSION

BACKGROUND OF THE INVENTION

1. Field of the Invention

This invention relates to a transmission which determines the power and speed with which the energy generated by an engine is conveyed to a drive shaft, especially to such a transmission for a motor vehicle.

2. Description of the Related Art

The basic function of the transmission for a wheeled vehicle is to transmit the energy generated by the engine to the drive wheels of the vehicle in such a manner as to enable the engine to operate efficiently. This is accomplished by altering the mechanical advantage between the engine and the drive wheels. Of course, this is generally true for any engine that powers a drive shaft, not just in the case of a wheeled vehicle.

A typical internal combustion engine provides the greatest power at high engine speeds, which may conveniently be expressed in revolutions per minute (rpm's) of the engine output shaft. Such an engine, however, uses the least fuel—and, consequently, achieves its greatest efficiency—at low rpm's. Recognizing this fact, most transmissions maintain the engine speed within practical limits by providing a fixed number of selective speed ratios, i.e., mechanical advantages, between the speed of the engine output shaft and the speed of the drive shaft.

The more speed ratios that are available, the more closely the actual engine speed may approximate the most efficient engine speed for a variety of loads. Thus, a five-speed ratio transmission is more efficient than a four-speed ratio transmission. And an ideal transmission would have an infinite number of speed ratios.

Furthermore, an ideal transmission would even decouple the resistance against which the engine operates (designated the "engine resistance") from the resistance against which the drive shaft must function (designated the "drive resistance"). With an ideal transmission achieving the twin goals of having an infinite number of speed ratios and decoupling the engine resistance from the drive resistance, there are no mathematical relationships between the variables associated with the engine output shaft (viz., the force, speed, and power of the engine output shaft, designated the "engine force", "engine speed", and "engine power", respectively) and the variables associated with the drive shaft (viz., the force, speed, and power of the drive shaft, designated the "drive force", "drive speed", and "drive power", respectively) except that a conservation of power exists, i.e., the engine power equals the drive power. This conservation simply asserts the logical proposition that the power expended by the vehicle equals the power consumed by the vehicle, for the ideal transmission.

In other words, decoupling the engine resistance from the drive resistance enables one to select an engine resistance which will enable the engine to operate on its power curve because the engine resistance can be varied so that at any given engine speed the engine power will be precisely that given by the power curve. Because the engine power varies almost linearly with engine speed between the first point of minimum engine power and the point of maximum engine power, the transmission can be simplified by selecting solely one value for engine resistance, i.e., the value which creates the approximated linear relationship. Then the operation of the engine will approximate the power curve.

And having an infinitely variable transmission enables whatever power that the engine produces to be adequate to move the vehicle (or operate against the drive resistance, whether the engine powers a vehicle or works against some other load). When a greater drive speed is desired, the engine speed (and, consequently, engine power) are simply increased.

Power equals force multiplied by speed. Hence, once the operator of a machine employing an engine to propel a drive shaft has selected the desired drive speed, the requisite drive power will be the product of such selected drive speed and the drive force, which drive force will simply be that resistive load that external conditions require the drive shaft to overcome. In the case of a wheeled vehicle, these external conditions logically include the mass of the vehicle, the slope of the ground which it is desired for the vehicle to traverse, and the coefficient of friction for the surface over which the vehicle will pass.

No prior art transmission appears to decouple the engine resistance from the drive resistance.

There have, however, been a number of designs for "infinitely variable" transmissions.

Conventional techniques for transmitting power from the engine to the drive shaft, i.e., converting engine power to drive power, invariably quantize the conversion by utilizing gears and sprockets which necessarily have a finite number of interlocking teeth or by employing ratchets which lock in only a finite number of positions.

The more successful designs for "infinitely variable" transmissions rely upon friction. Generally these transmissions have a belt which wraps around two cone-shaped pulleys. One pulley, i.e., the engine pulley, is connected to the engine; the other pulley, i.e., the drive pulley is connected to the drive shaft. By varying the location of the belt on one or both cone-shaped pulleys the ratio of their diameters (which determines the mechanical advantage for the transmission) may be continuously varied. Because the range of such ratios, although large, is necessarily finite, such transmissions are more appropriately termed "continuously variable transmissions." A similar design involves the use of toothless gears.

However, for both approaches, the torque can logically be no larger than the force of the friction without producing slippage; so, these continuously variable transmissions are limited to very low power applications. Also, the friction involved produces significant wear.

U.S. Pat. No. 4,042,056 deals with a vehicle which contains both an internal combustion engine and an electric motor. The vehicle can be propelled by either system or simultaneously by both. One pair of wheels is powered by the internal combustion engine through a magnetic clutch and differential. The other pair is powered by the electric motor through a continuously variable transmission using the type of cone-shaped pulleys connected by a belt that were described above. In the claims, the transmission is appropriately called "a variable-ratio mechanical transmission."

And at page 64 of the November, 1994, issue of the periodical Mechanical Engineering (volume 116, number 11) in an article entitled "Is CVT the Car Transmission of the Future?" the cone-shaped pulleys are utilized; but the transmission is improved by replacing the normal "pull belt" with a multi-segment steel "push belt" which can transmit higher torques than allowed by the limited strength of a "pull belt."

In conjunction with the present invention, pneumatic propulsion systems for vehicles, also, merit consideration. Although none of the inventors for such systems appeared to recognize that the portion of such system between the engine-powered air compressor and the drive engine, i.e., the engine which directly provides the power to propel the vehicle, could be considered to be a transmission, such a relationship does seem to exist in the pneumatic propulsion systems of fourteen United States patents, viz., U.S. Pat. Nos. 1,688,591; 2,839,269; 2,966,776; 3,925,984; 4,018, 050; 4,043,126; 4,060,987; 4,123,910; 4,355,508; 4,360, 222; 4,383,589; 4,404,800; 4,478,304; and 4,596,119.

Only one of these patents, i.e., U.S. Pat. No. 4,018,050, clearly decouples the compressor (and, implicitly, the engine which is never expressly mentioned but which must drive the compressor) from the drive forces; a pressure regulator between the compressor and the pneumatically powered engine which furnishes power to the drive wheels provides such decoupling.

The device of U.S. Pat. No. 4,404,800 does, however, include an auxiliary compressor. Since various compressors exist within the system of that device and since many are explained in sufficient detail to clarify that they, themselves, include no engine, it is not certain that the auxiliary compressor contains an engine; if not, however, the auxiliary compressor must be powered by an undisclosed external engine to avoid having the device be a perpetual motion machine. A pressure regulator between the high-pressure tank (to which air from the auxiliary compressor is sent) and the low-pressure tank (which powers the drive—or power output—engine) decouples the auxiliary compressor (and any engine that powers the auxiliary compressor) from the drive forces.

Although the invention of U.S. Pat. No. 4,478,304 simply has tanks that are charged with air to a high pressure and includes no compressor to accomplish such charging, if the invention did included a compressor and an associated engine to operate the compressor, a pressure regulator which is located on the input to the pneumatic drive engine would decouple the compressor and its associated engine from the drive forces.

And the device of U.S. Pat. No. 2,839,269 closes a valve between the compressor (more accurately, the reservoirs that are supplied with compressed air by the compressor) and the pneumatic drive engine " . . . until air has been built up within the reservoirs . . . to a selected pressure." This is, however, immaterial because the valve is opened when it is desired for the vehicle to move. Thus, the compressor and the electrical engine which operates it are not decoupled from the drive forces when the system is actually propelling the vehicle.

But none of these patents-even those in which the engine that operates the compressor is decoupled from the drive forces—maintains the compressed air at such a pressure as to create the optimal resistance for the engine that operates the compressor, i.e., an engine resistance which will enable the engine to operate on its power curve so that at any given engine speed the engine power will be precisely that given by the power curve.

Furthermore, all of the cited patents except U.S. Pat. No. 4,383,589 maintain the air pressure which is supplied to the pneumatic drive motor at a specified level, assure that such pressure does not fall below a set minimum value, or preclude the air from reaching the pneumatic drive motor until a stated minimum level of air pressure has been attained. (Despite the fact that U.S. Pat. No. 4,383,589 does not expressly provide that a given minimum pressure must be obtained before air is provided to the pneumatic drive motor, such is obviously the case because the system of that patent does not create the initial air pressure; it merely works to restore pressure when air is used to propel the vehicle. An initial supply of compressed air at a given pressure must be supplied from an external source to the tank which supplies the pneumatic drive engine.) Such restrictions on input air pressure to the pneumatic drive engine prevent a gas-based transmission from being infinitely variable or continuously variable, as will be discussed more fully below.

SUMMARY OF THE INVENTION

The present invention decouples the engine which operates the compressor from the drive forces.

The compressor is preferably a simple positive displacement pump, although other types of compressors—such as a turbine pump—would be satisfactory. In any event, the force of resistance to the input for the pump, i.e., the engine resistance, is determined solely by the pressure of the gas on the output of the pump, which is directed into the input of a high-pressure reservoir. In a preferred alternative, though, the compressor is eliminated; the exhaust gas from an engine, which must then be any engine which produces gas, would be fed directly into the input of the high-pressure reservoir. Here the engine resistance is determined by the back-pressure on the engine exhaust.

Still, the pressure within the high-pressure reservoir constitutes the pressure of the gas on the output of the pump when a positive displacement pump is utilized and establishes the back-pressure on the engine exhaust when such exhaust is used directly.

The output from the high-pressure reservoir goes to a first pressure regulator, which controls the pressure within the high-pressure reservoir. This first pressure regulator can be controlled by a computer which is connected to the pressure regulator and also to a throttle sensor that measures the throttle setting for the engine. The user chooses the engine power by selecting the appropriate throttle setting. The throttle sensor then determines what throttle setting has been chosen and communicates this fact to the computer. Having in its memory the desired engine power that corresponds to any given throttle setting as well as the power curve for the engine, the computer determines, and directs the first pressure regulator to adjust, the pressure within the high-pressure reservoir to achieve the ideal engine speed for that choice of engine power, i.e., the lowest engine speed which can produce the desired engine power. Of course, the relationship between engine power and engine speed is then defined precisely by the power curve. Preferably a speed sensor will be connected to both the engine and the computer in order to provide the computer with the actual speed of the engine in order to permit the computer to verify that the appropriate engine speed has been achieved and to enable the computer to direct the first pressure regulator to make any corrections to the pressure within the high-pressure reservoir necessary to achieve the ideal engine speed.

Optionally, because the engine power varies almost linearly with engine speed between the first point of minimum engine power and the point of maximum engine power, the Optimized Gas-based Transmission can be simplified by selecting solely one value for engine resistance, i.e., the value which creates the approximated linear relationship. Then the operation of the engine will approximate the power curve. This is, of course, accomplished simply by having the first pressure regulator set to maintain the one appropriate value for pressure in the high-pressure reservoir. The first pressure regulator opens more if the pressure within the high-pressure reservoir is too high and closes more if such pressure is too low.

Any pressure regulator within the Optimized Gas-based Transmission can be any device which maintains a constant upstream pressure. Among the devices which would be satisfactory are either the traditional mechanical regulator or an electrical control which would sense the upstream pressure and open a valve until such upstream pressure attains the desired level.

The compressibility of the gas within the Optimized Gas-based Transmission is next exploited to create the desired continuously (essentially, infinitely) variable mechanical advantage.

The gas flows from the high-pressure reservoir and through the pressure regulator to a variable-pressure reservoir. Next the gas travels to and activates a gas-operated drive motor which is preferably just a positive displacement pump functioning in reverse.

As additional gas is supplied to the variable-pressure reservoir, the gas compresses to fill the volume provided by the variable-pressure reservoir and, consequently, increases the pressure within such variable-pressure reservoir. When the pressure has reached the precise level necessary, for a given load, i.e., for a given drive resistance, to rotate the drive shaft of the gas-operated drive motor, the drive shaft will begin to rotate. If a faster rotation is desired, the speed of the engine filling the high-pressure reservoir is simply increased to increase the rate at which gas flows into the high-pressure reservoir and, consequently, into the variable-pressure reservoir.

When the load or drive resistance increases, more gas must be compressed within the variable-pressure reservoir to create the higher pressure necessary to rotate the drive shaft. Consequently, output or drive torque will increase; but output or drive speed will decrease. If it is desired to maintain the same drive speed as before the drive resistance increased, the speed of the engine filling the high-pressure reservoir must again be increased.

Conversely, when the drive resistance decreases, less gas needs to be compressed within the variable-pressure reservoir to create the lower pressure then required to rotate the drive shaft. Consequently, drive torque will decrease; but drive speed will increase. If it is desired to maintain the same drive speed as before the drive resistance decreased, the speed of the engine filling the high-pressure reservoir must simply be decreased.

Such a transmission, thus, has a self-regulating mechanical advantage, which-since no predetermined limits are placed upon the pressure within the variable-pressure reservoir—is continuously (and, essentially, infinitely) variable.

Figure 5:
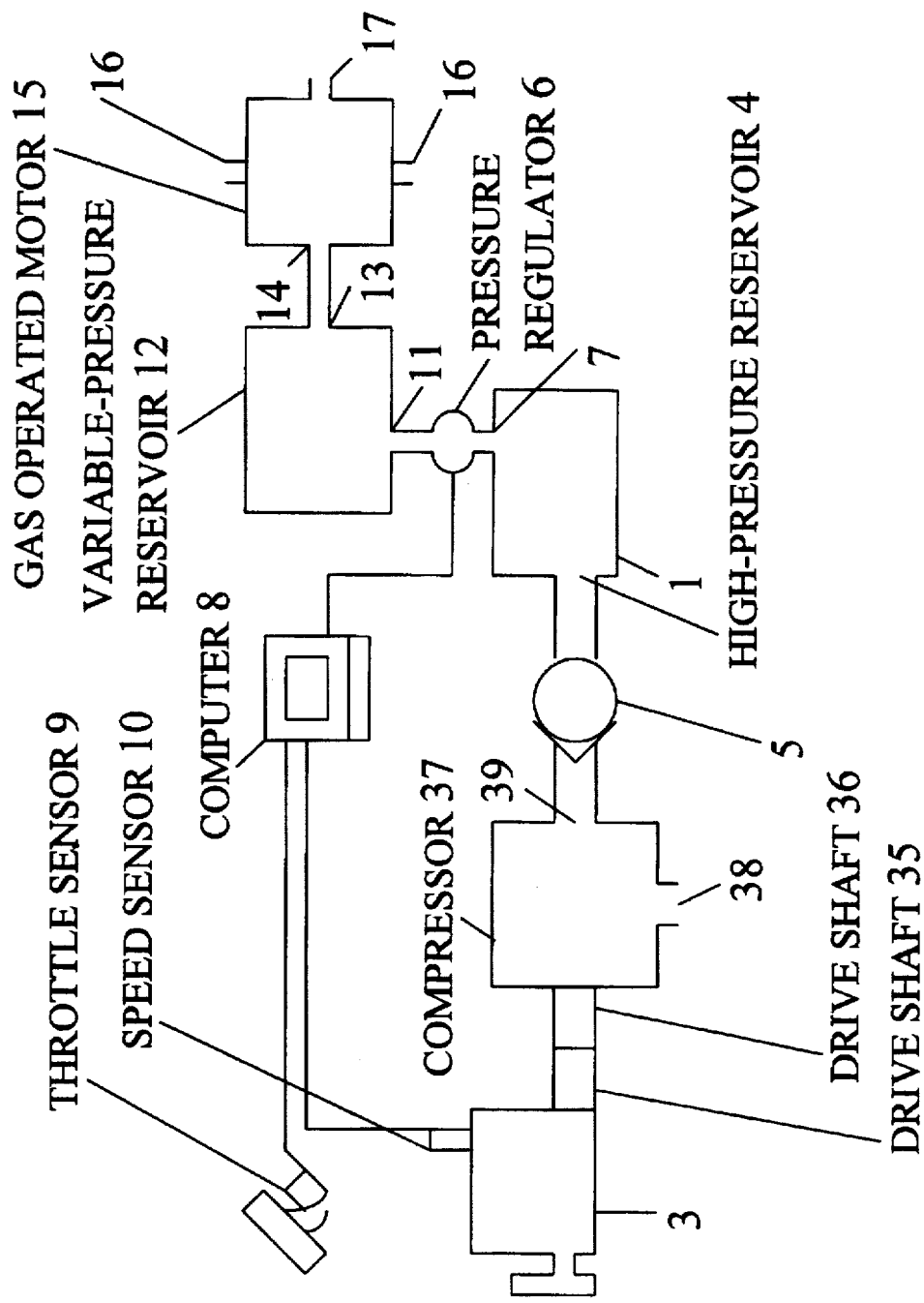
FIG. 5 portrays an embodiment which is the same as that of FIG. 1 with the exception that rather than having the exhaust gas go to the high-pressure reservoir, a drive shaft from the engine runs a pressurization pump which compresses air into the high-pressure reservoir.
Figure 9:
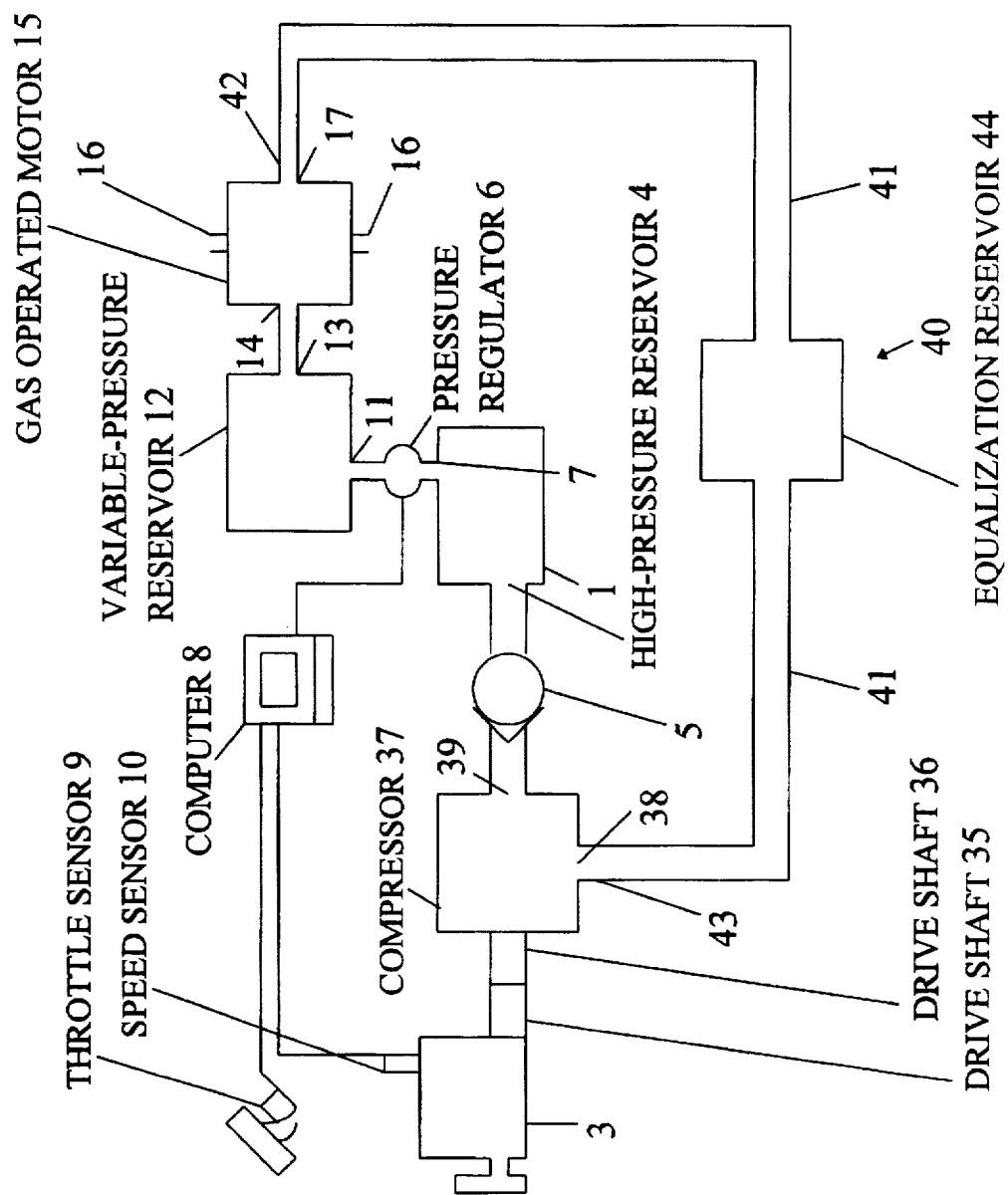

The embodiment shown in FIG. 9 adds to the embodiment of FIG. 5 the features which create a closed gas system.

Figure 6:
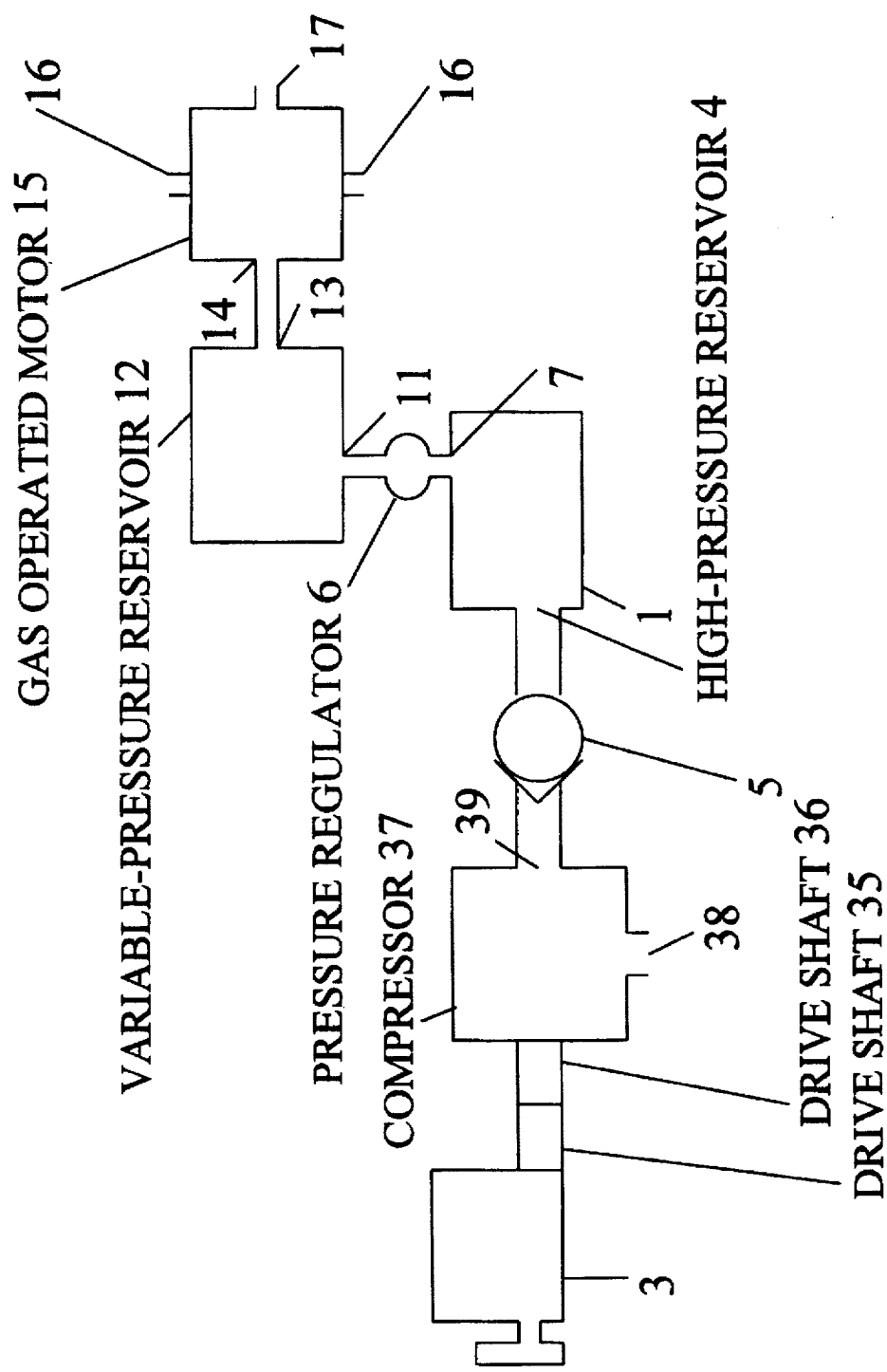
FIG. 6 depicts an embodiment which is identical to that of FIG. 2 with the exception that rather than having the exhaust gas go to the high-pressure reservoir, a drive shaft from the engine runs a pressurization pump which compresses air into the high-pressure reservoir.
Figure 10:
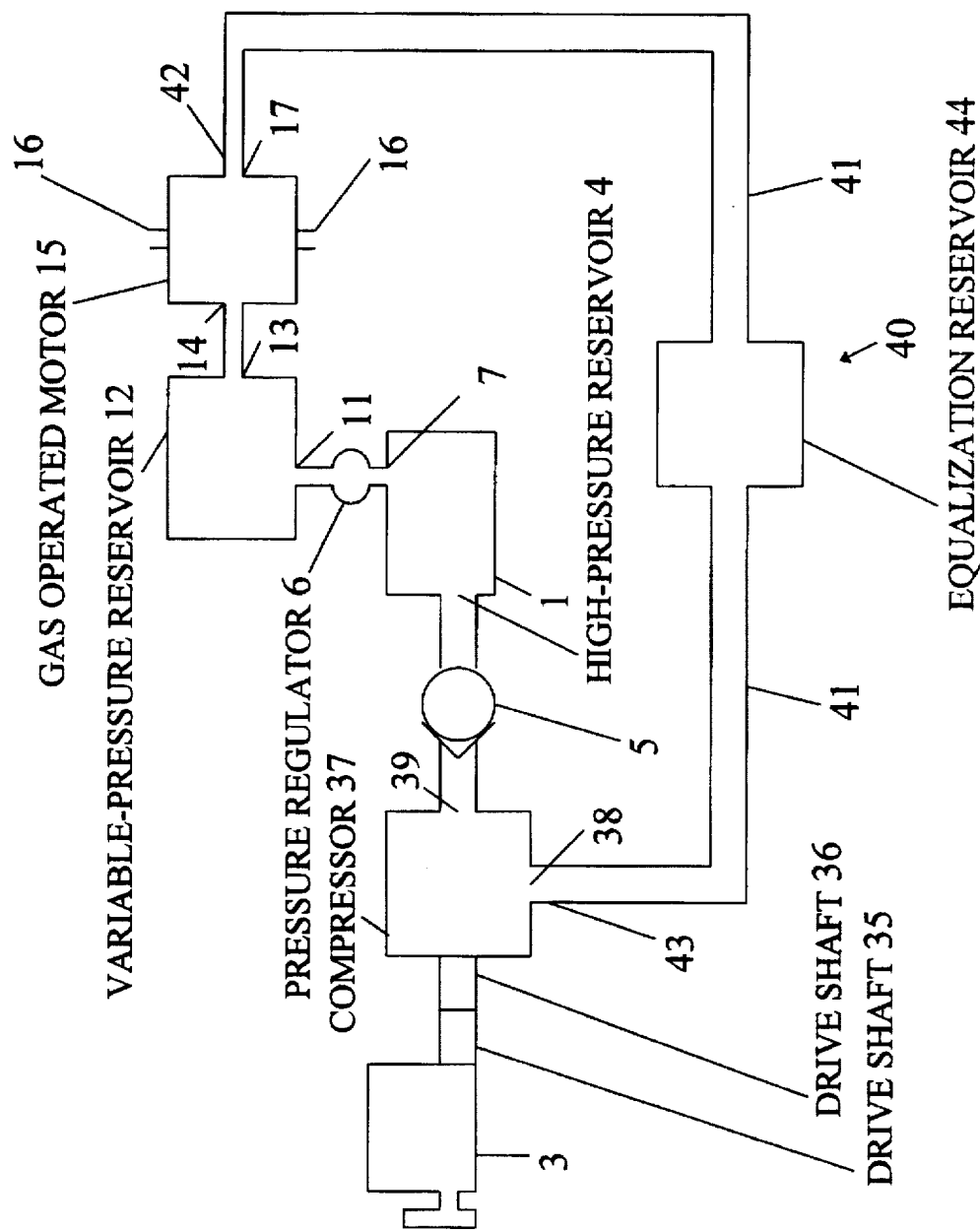

The embodiment depicted in FIG. 10 adds to the embodiment of FIG. 6 the features which create a closed gas system.

Figure 7:
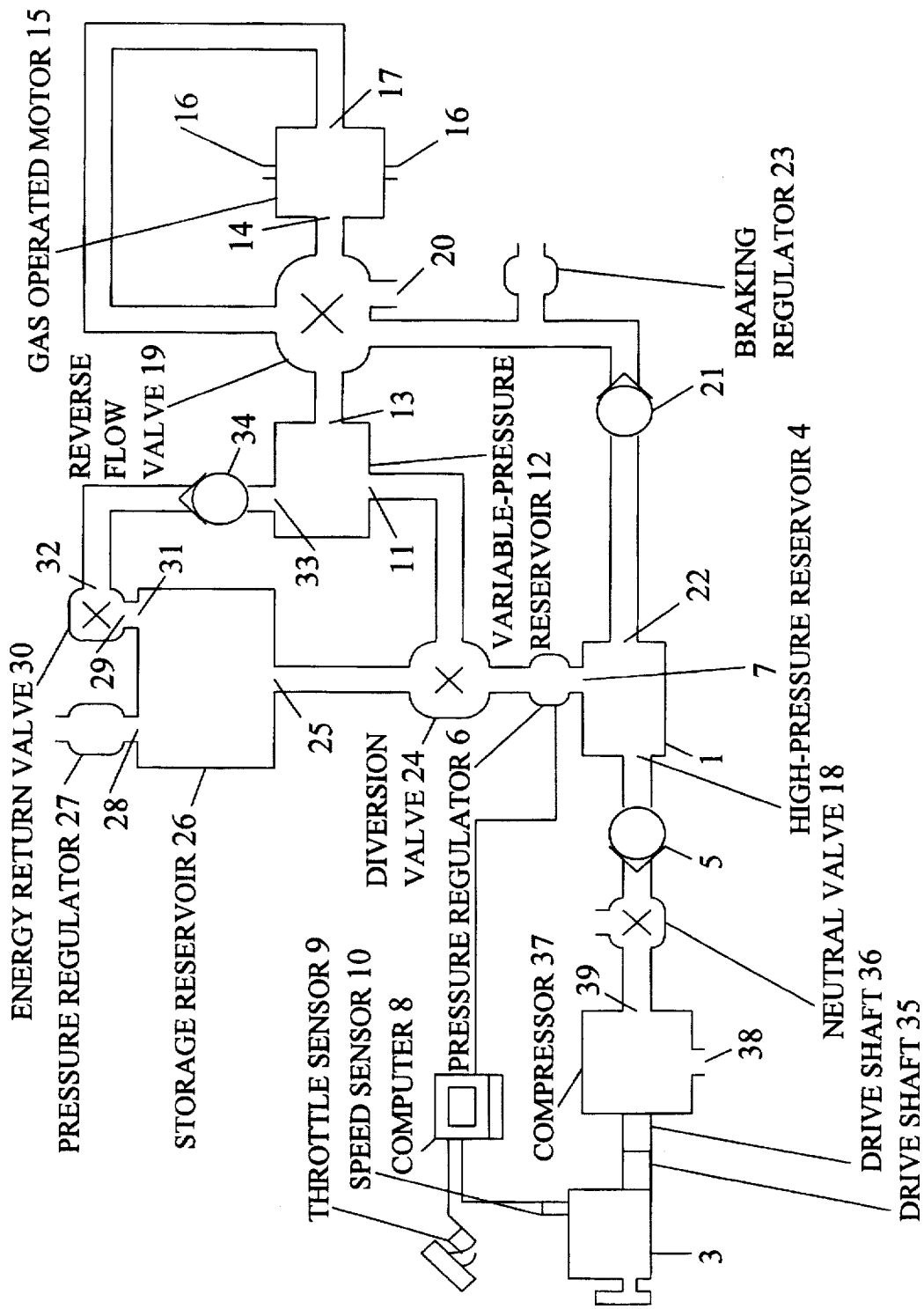
FIG. 7 illustrates an embodiment which differs from that of FIG. 3 only in the fact that rather than having the exhaust gas go to the high-pressure reservoir, a drive shaft from the engine runs a pressurization pump which compresses air into the high-pressure reservoir.
Figure 11:
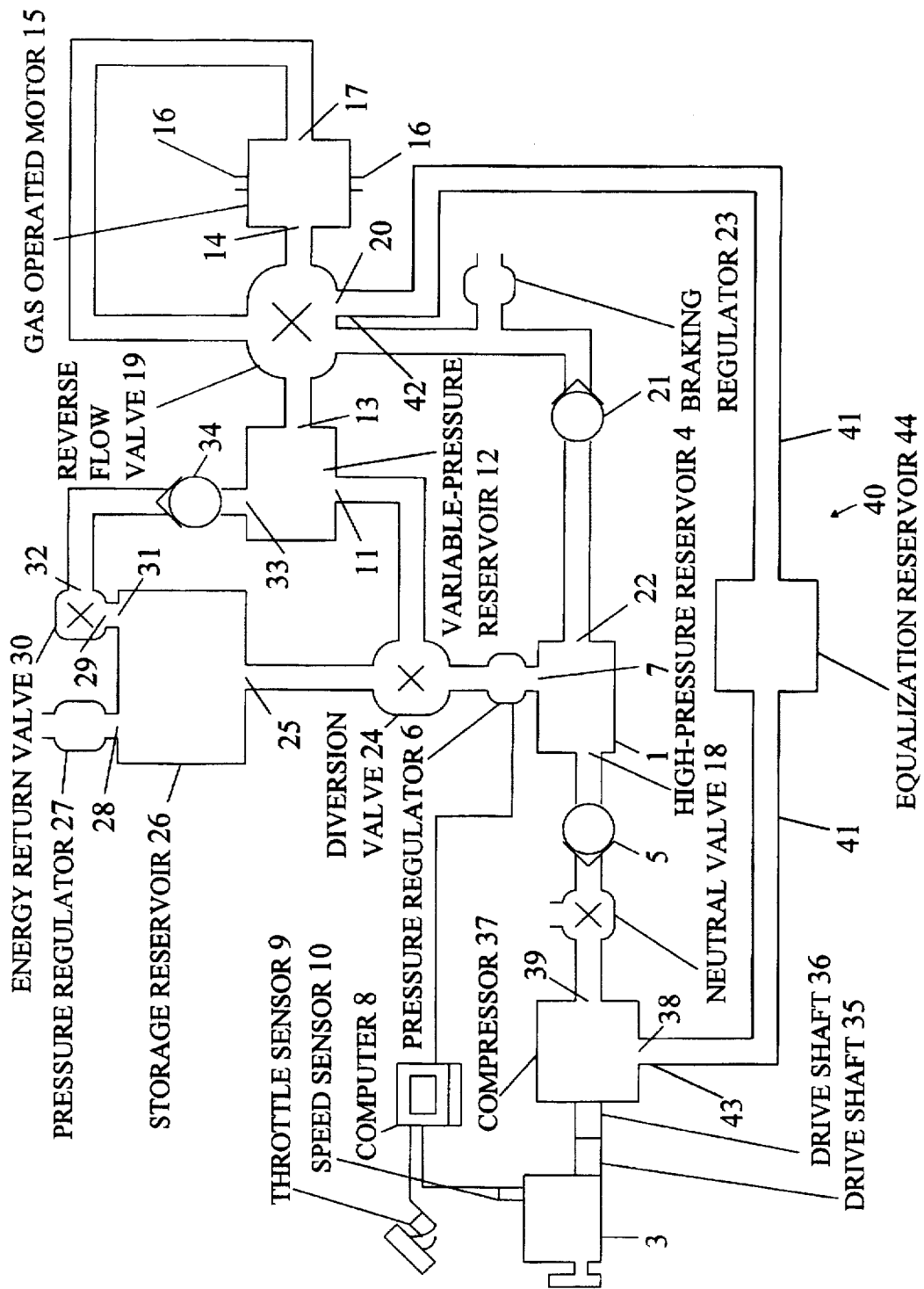

The embodiment illustrated in FIG. 11 adds to the embodiment of FIG. 7 the features which create a closed gas system.

Figure 8:
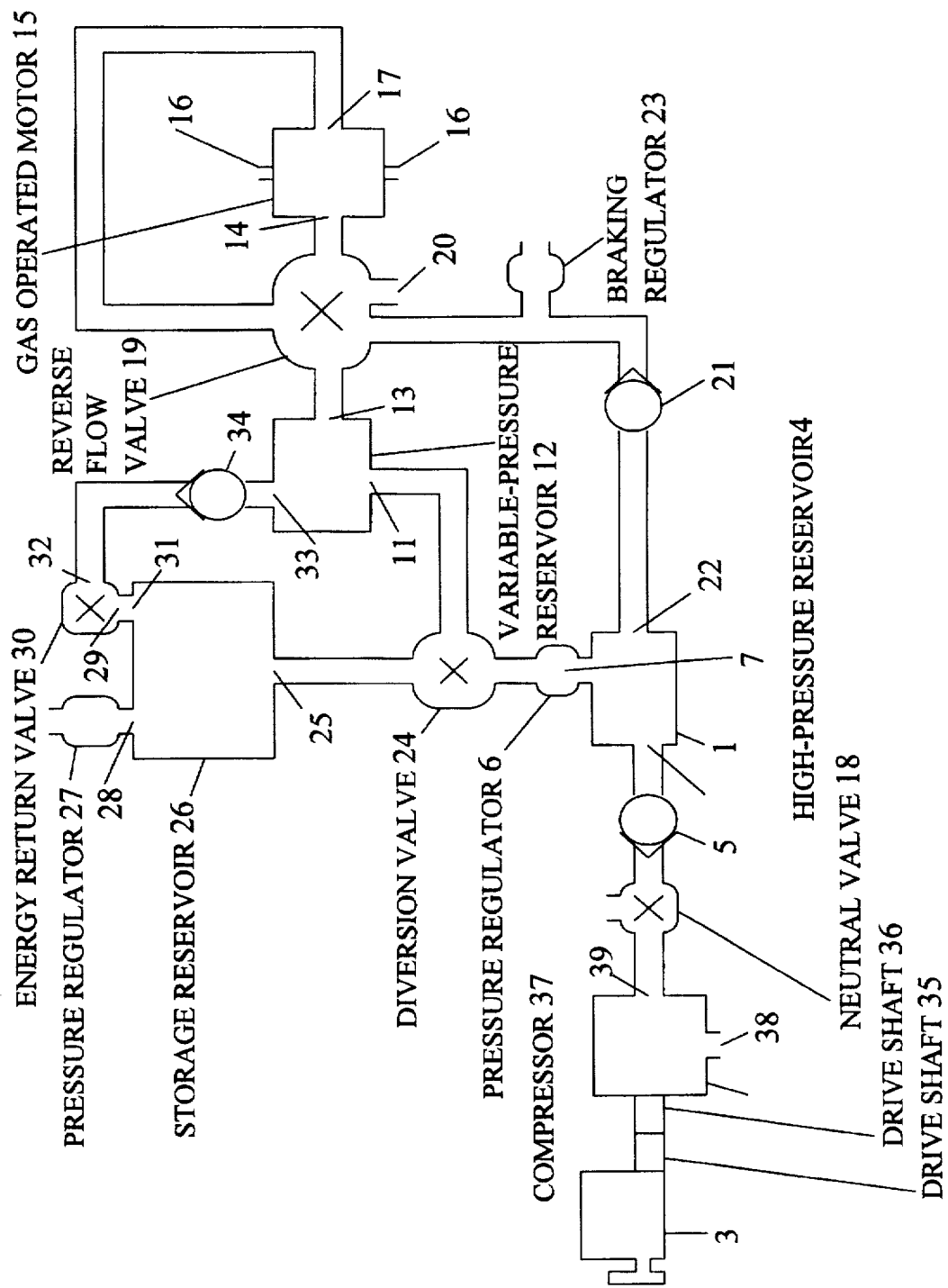
FIG. 8 portrays an embodiment which is distinguishable from the embodiment of FIG. 4 only by the fact that rather than having the exhaust gas go to the high-pressure reservoir, a drive shaft from the engine runs a pressurization pump which compresses air into the high-pressure reservoir.
Figure 12:
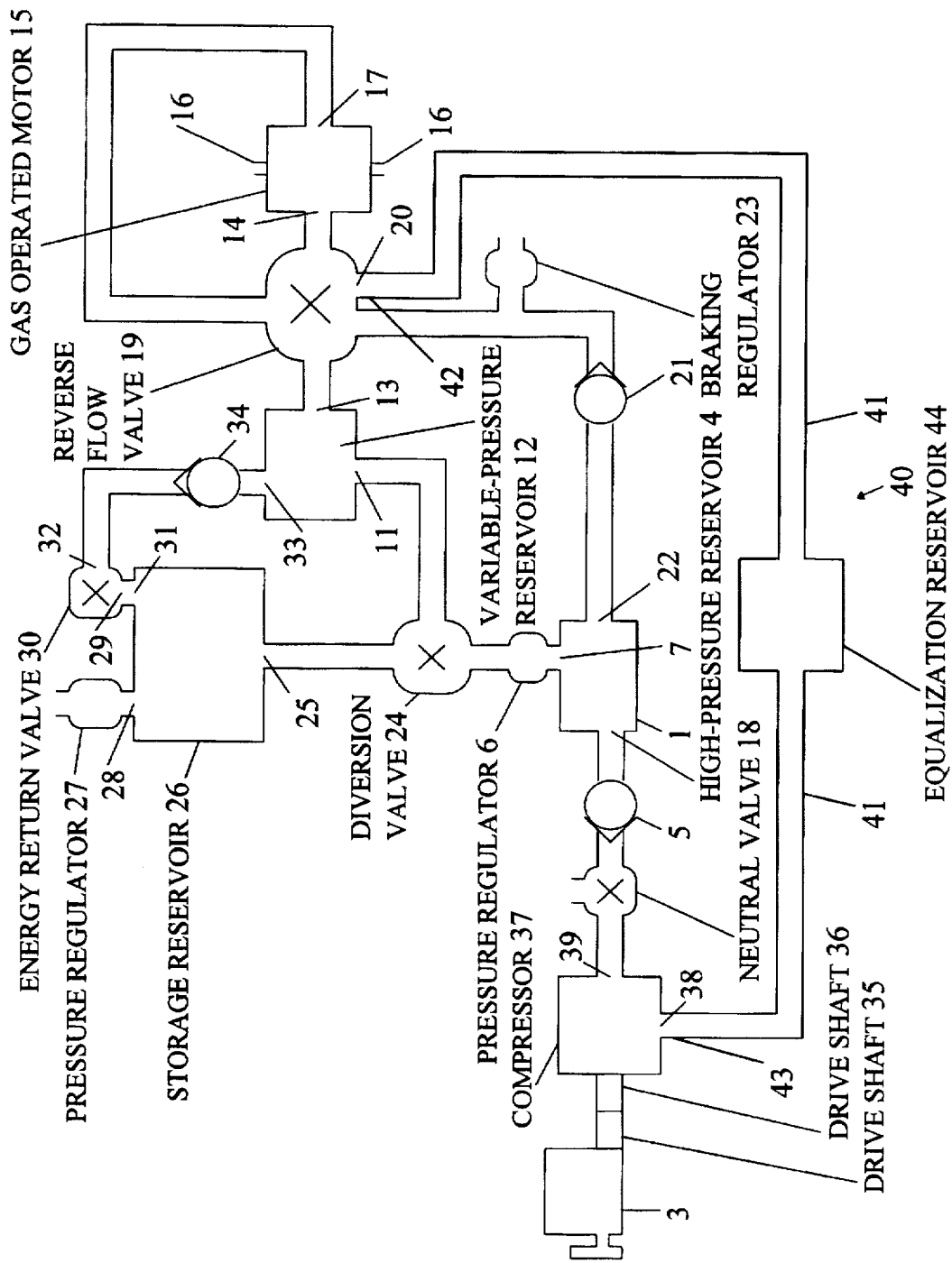

The embodiment portrayed in FIG. 12 adds to the embodiment of FIG. 8 the features which create a closed gas system.

Figure 13:
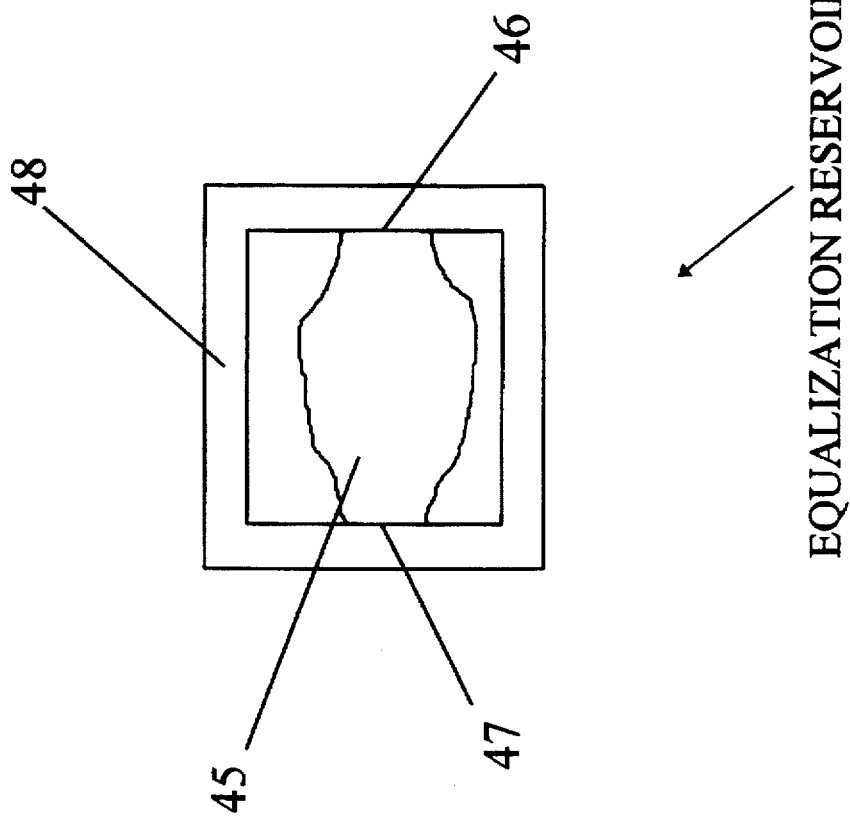

FIG. 13 shows the features of the equalization reservoir.

Figure 14:
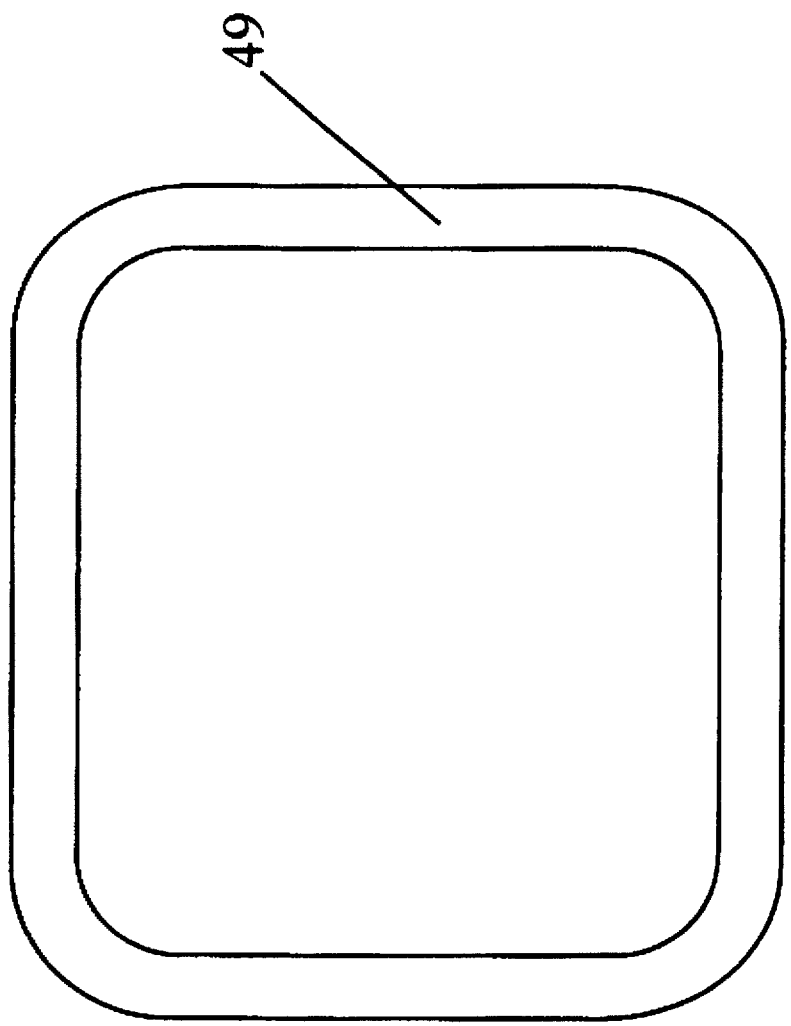

FIG. 14 depicts the use of thermal insulation in covering the exterior surface of the components in the Optimized Gas-based Transmission.

DESCRIPTION OF THE PREFERRED EMBODIMENT

Figure 1:
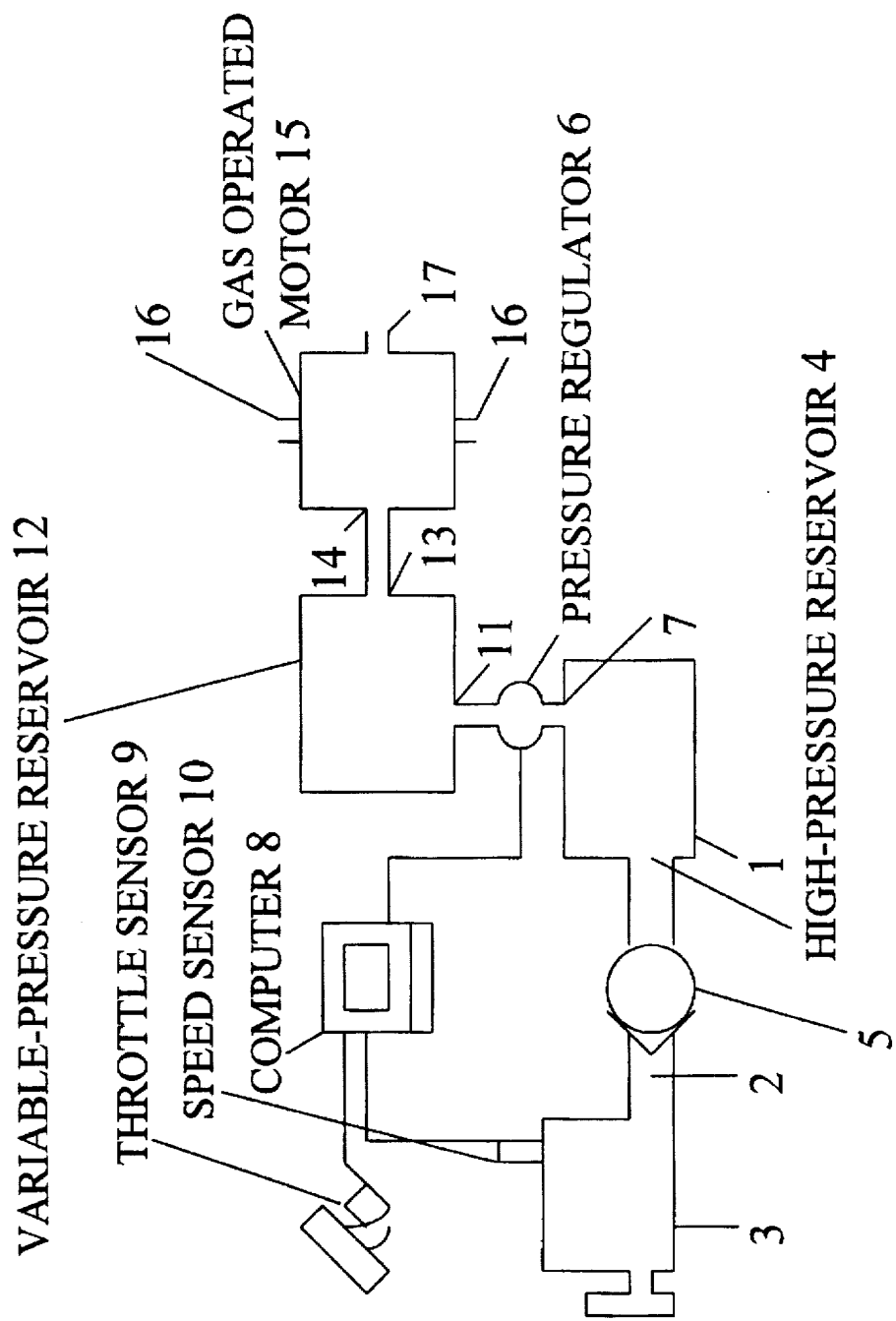
FIG. 1 depicts an embodiment of the Optimized Gas-based Transmission in which the exhaust gas from an engine is conveyed directly to a high-pressure reservoir, then through a first pressure regulator to a variable-pressure reservoir, and subsequently to a gas-operated drive motor. A computer controls the first pressure regulator.

The Optimized Gas-based Transmission, as illustrated in FIG. 1, has a high-pressure reservoir 1. The exhaust gas 2 from an engine 3 the operation of which produces gas, is directed into the input 4 of the high-pressure reservoir 1. Preferably, a first check valve 5 between the engine 3 and the high-pressure reservoir 1 permits the exhaust gas 2 to flow only from the engine 3 to the high-pressure reservoir 1, i.e., the first check valve 5 precludes the exhaust gas 2 from flowing from the high-pressure reservoir 1 to the engine 3.

The pressure within the high-pressure reservoir 1 is controlled by a first pressure regulator 6, the input of which first pressure regulator 6 is attached to the output 7 of the high-pressure reservoir 1. The first pressure regulator 6 is connected to and can be controlled by a computer 8 which is also connected to a throttle sensor 9.

As discussed above, the user chooses the engine power by selecting the appropriate throttle setting. The throttle sensor 9 then determines what throttle setting has been chosen and communicates this fact to the computer 8. Having in its memory the desired engine power that corresponds to any given throttle setting as well as the power curve for the engine 3, the computer 8 determines, and directs the first pressure regulator 6 to adjust, the pressure within the high-pressure reservoir 1 to achieve the ideal engine speed for that choice of engine power, i.e., the lowest engine speed which can produce the desired engine power. Of course, the relationship between engine power and engine speed is then defined precisely by the power curve. Preferably a speed sensor 10 will be connected to both the engine 3 and the computer 8 in order to provide the computer 8 with the actual speed of the engine 3 in order to permit the computer 8 to verify that the appropriate engine speed has been achieved and to enable the computer 8 to direct the first pressure regulator 6 to make any corrections to the pressure within the high-pressure reservoir 1 necessary to achieve the ideal engine speed.

Optionally, as also mentioned above, because the engine power varies almost linearly with engine speed between the first point of minimum engine power, i.e., the point where both engine speed and engine power have minima, and the point of maximum engine power, the Optimized Gas-based Transmission can be simplified by selecting solely one value for engine resistance, i.e., the value which creates the approximated linear relationship. Then the operation of the engine 3 will approximate the power curve. This is, of course, accomplished simply by having the first pressure regulator 6 set to maintain the one appropriate value for pressure in the high-pressure reservoir 1. The first pressure regulator 6 opens more if the pressure within the high-pressure reservoir 1 is too high and closes more if such pressure is too low. (FIG. 2 portrays this optional embodiment, which accordingly includes neither the computer 8 nor the speed sensor 10.)

The output of the first pressure regulator 6 is attached to the input 11 of a variable-pressure reservoir 12 so that the gas can flow from the high-pressure reservoir 1, through the first pressure regulator 6, and into the variable-pressure reservoir 12.

Connected to the output 13 of the variable-pressure reservoir 12 is the input 14 of a gas-operated drive motor 15. (This gas-operated drive motor 15 is, preferably, a simple positive-displacement pump.) When sufficient pressure exists within the variable-pressure reservoir 12, the gas will enter the input 14 of the gas-operated drive motor 15, cause the drive shaft 16 of the gas-operated drive motor 15 to rotate, and exit the gas-operated drive motor 15 through the output 17 of the gas-operated drive motor 15.

The Optimized Gas-based Transmission then functions, as described above, to create a self-regulating continuously (and, essentially, infinitely) variable mechanical advantage.

Figure 2:
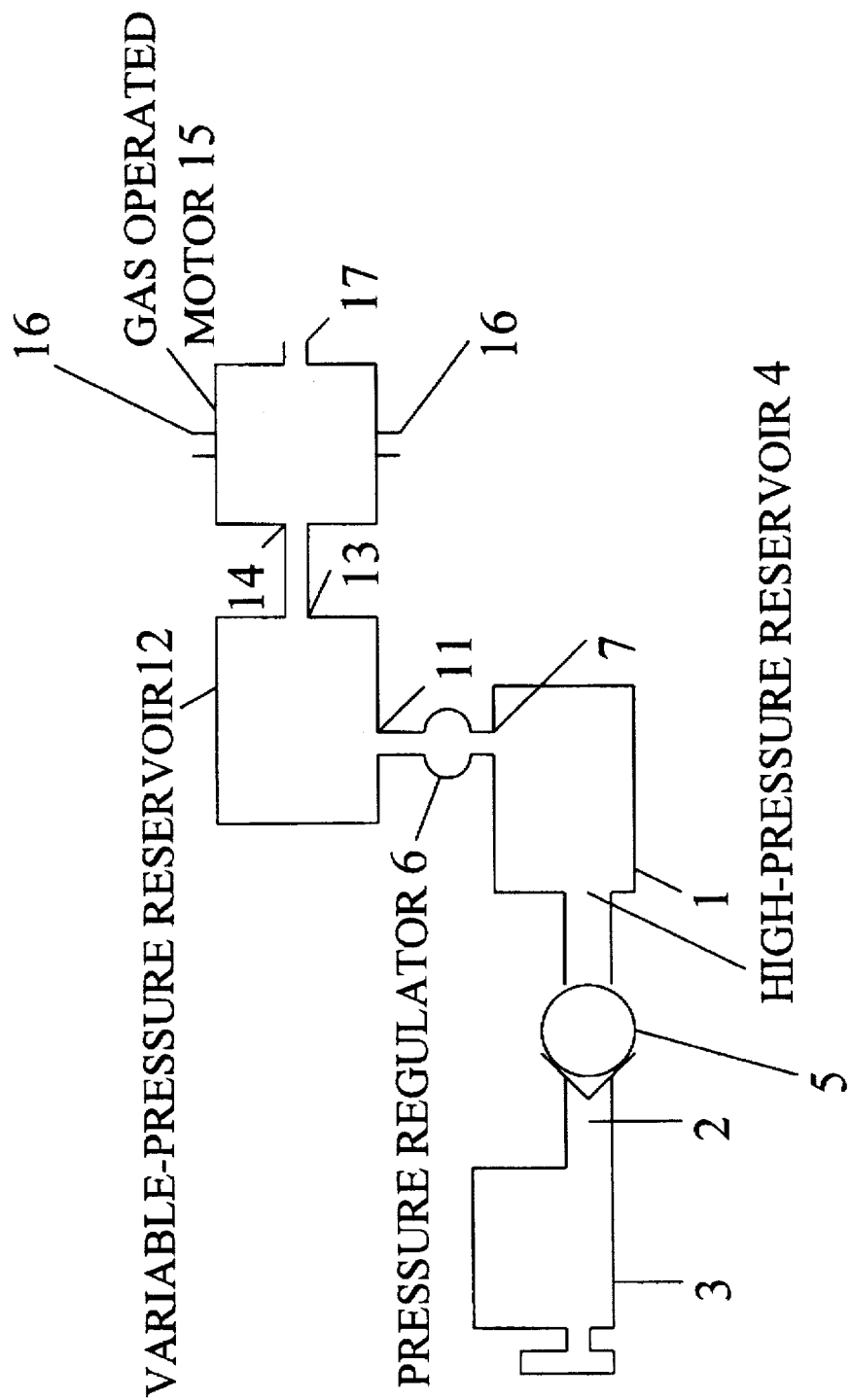
FIG. 2 illustrates an embodiment which is the same as the embodiment of FIG. 1 with the exception that there is no computer. Instead, the first pressure regulator is set at a fixed value to create the linear relationship between engine power and engine speed that approximates the portion of the power curve from the first point of minimum engine power, i.e., the point where both engine speed and engine power have minima, to the point of maximum engine power.
Figure 3:
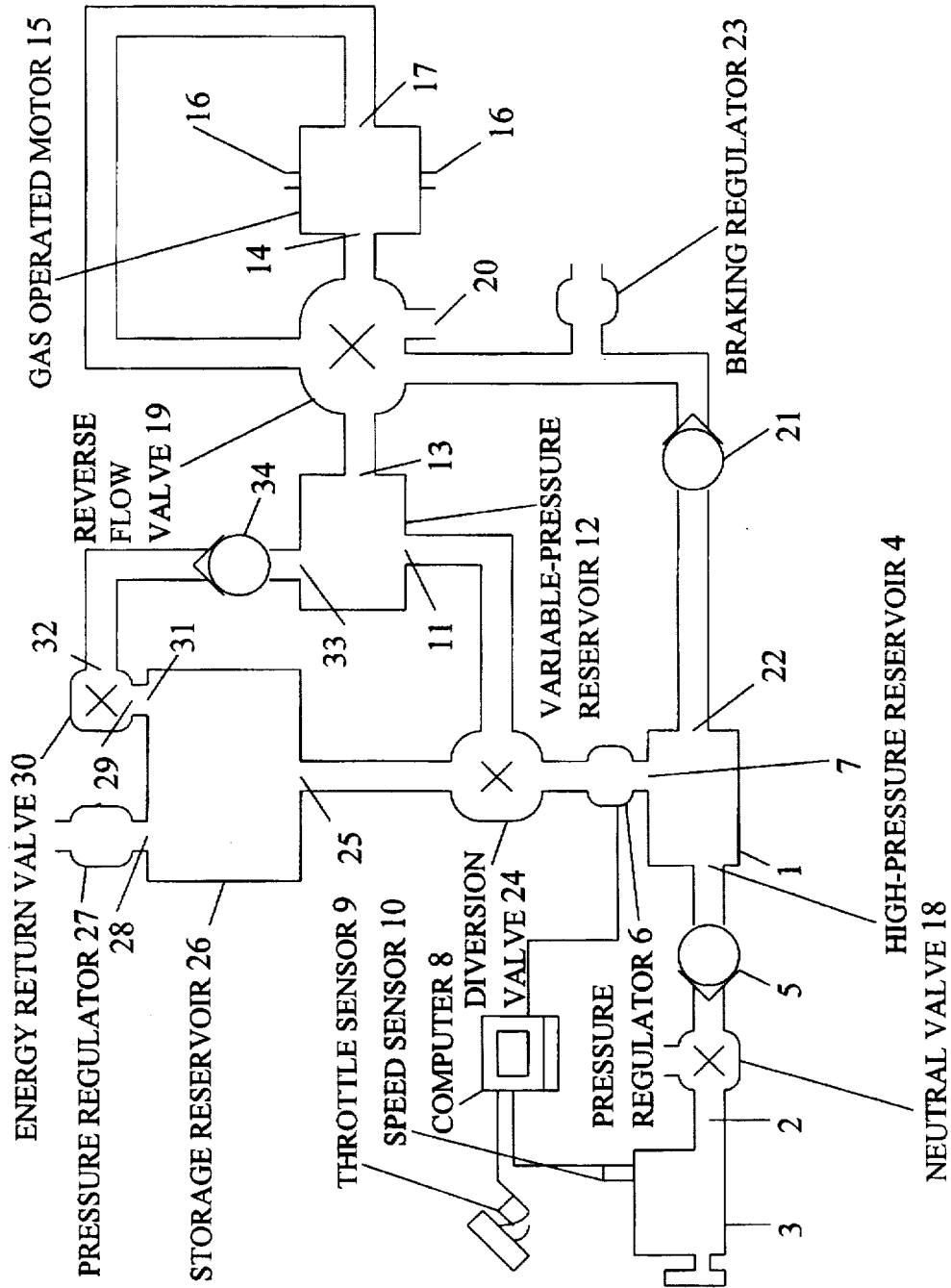
FIG. 3 shows an embodiment which adds to the embodiment of FIG. 1 a neutral valve as well as the features which permit reversing the direction of propulsion, braking, and energy recovery.
Figure 4:
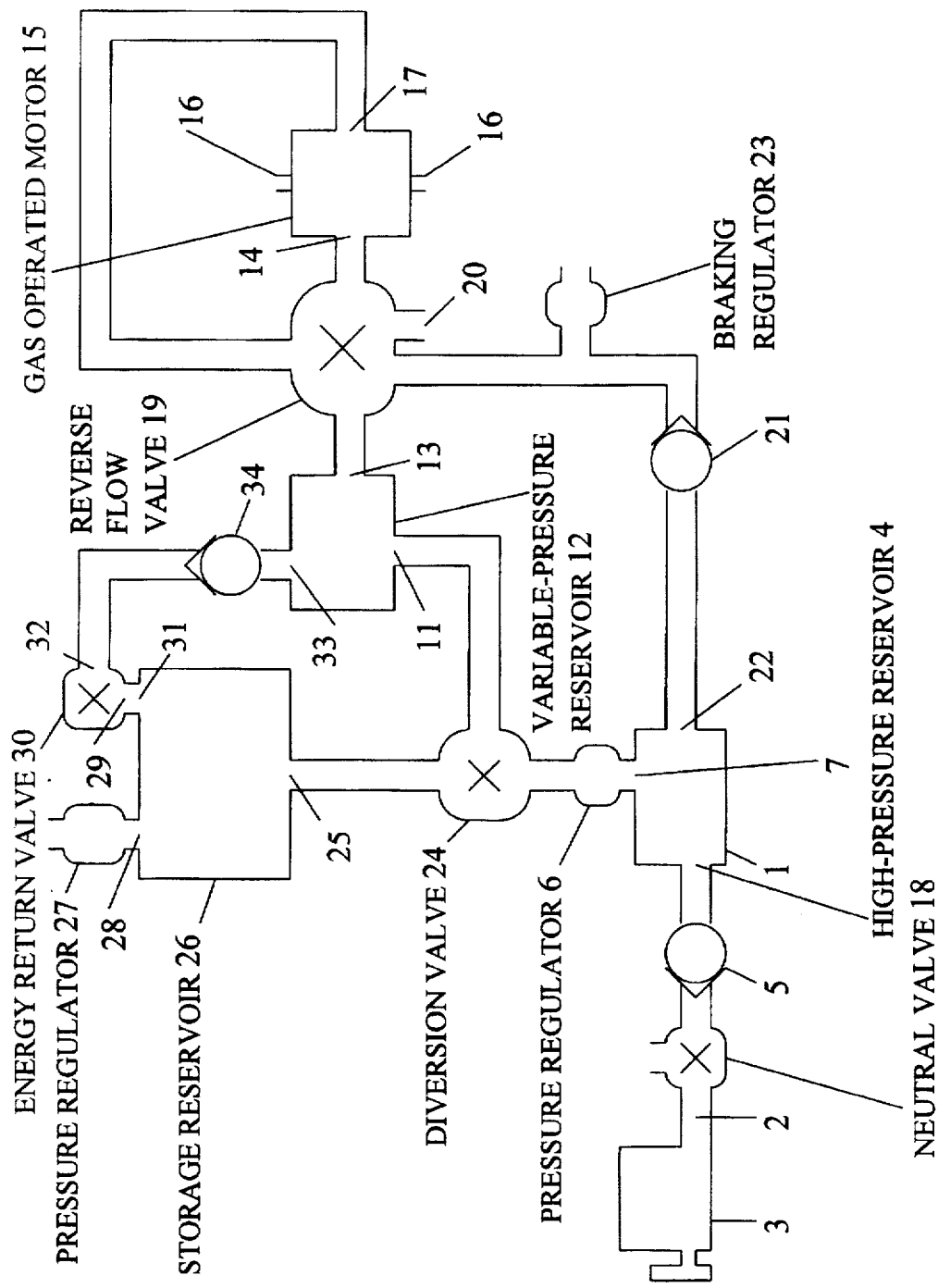
FIG. 4 demonstrates an embodiment which adds to the embodiment of FIG. 2 a neutral valve as well as the features which permit reversing the direction of propulsion, braking, and energy recovery.

Either with the first pressure regulator 6 controlled by a computer 8, as illustrated in FIG. 1, or with the first pressure regulator 6 set at the one appropriate value for pressure in the high-pressure reservoir 1, as depicted in FIG. 2, the Optimized Gas-based Transmission preferably includes several additional features. For the embodiment of FIG. 1, these additional features are provided in FIG. 3; for the embodiment of FIG. 2, they are given in FIG. 4.

A neutral valve 18 inserted between the engine 3 and the first check valve 5 has two settings. In the first setting, the neutral valve 18 conveys the exhaust gas 2 from the engine 3 to the input 4 of the high-pressure reservoir 1. In the second setting, however, the neutral valve 18 directs the exhaust gas 2 from the engine 3 to the atmosphere, thereby making the engine resistance negligible. In its second setting the neutral valve 18 also precludes gas from flowing between the input 4 of the high-pressure reservoir 1 and either the engine 3 or the atmosphere, i.e., the neutral valve 18 closes the input of the high-pressure reservoir 1.

Similarly, a reverse flow valve 19 is connected to the output 13 of the variable-pressure reservoir 12 and to both the input 14 and the output 17 of the gas-operated drive motor 15. In its first setting, the reverse flow valve 19 directs the gas from the output 13 of the variable-pressure reservoir 12 to the input 14 of the gas-operated drive motor 15 and vents the output 17 of the gas-operated drive motor 15 through an exhaust port 20 to the atmosphere so that the drive shaft 16 of the gas-operated drive motor 15 rotates in a direction defined as its forward direction. In its second setting, however, the reverse flow valve 19 conducts the gas from the output 13 of the variable-pressure reservoir 12 to the output 17 of the gas-operated drive motor 15 and vents the input 14 of the gas-operated drive motor 15 through the exhaust port 20 to the atmosphere so that the gas flows through the gas-operated drive motor 15 in a direction opposite to that when the reverse flow valve 19 is in its first setting, thereby causing the drive shaft 16 of the gas-operated drive motor 15 to rotate in its reverse direction.

A third setting of the reverse flow valve 19 provides a braking mode for the Optimized Gas-based Transmission.

Besides being connected to the high-pressure reservoir 1 through the variable-pressure reservoir 12 and the first pressure regulator 6, the reverse flow valve 19 is connected to a second check valve 21 which is, in turn, attached to a secondary input 22 of the high-pressure reservoir 1. When the reverse flow valve 19 is in its third setting, the neutral valve 18 is placed in its second setting-to direct the exhaust gas 2 from the engine 3 to the atmosphere, thereby making the engine resistance negligible. The reverse flow valve 19, in its third setting, then connects the input 14 of the gas-operated drive motor 15 to the exhaust port 20 and the output 17 of the gas-operated drive motor 15 to the second check valve 21. Since it is desired to decelerate a forward rotation of the drive shaft 16 of the gas-operated drive motor 15, the drive shaft 16 will then logically be rotating in its forward direction and will, consequently, cause air to be drawn through the exhaust port 20 into the input 14 of the gas-operated drive motor 15; conduct the air through the gas-operated drive motor 15; and push the air through the output 17 of the gas-operated drive motor 15, past the second check valve 21, and into the secondary input 22 of the high-pressure reservoir 1. The second check valve 21 prevents gas from leaving the high-pressure reservoir 1 through the secondary input 22 of the high-pressure reservoir 1.

The pressure within the high-pressure reservoir 1, in this instance, provides resistance to the operation of the gas-operated drive motor 15 and, thereby, a braking effect on the rotation of the drive shaft 16 of the gas-operated drive motor 15. Preferably, a braking regulator 23 is inserted between the second check valve 21 and the reverse flow valve 19. The braking regulator 23 releases air to the atmosphere at selected rates which may be varied by the user to control the severity of the braking effect.

If the drive shaft 16 of the gas-operated drive motor 15 is rotating in its reverse direction when the braking effect is desired, the fourth setting of the reverse flow valve 19 is utilized. The reverse flow valve 19 then connects the output 17 of the gas-operated drive motor 15 to the exhaust port 20 and the input 14 of the gas-operated drive motor 15 to the second check valve 21. (As in the case of the third setting for the reverse flow valve 19, when the fourth setting of the reverse flow valve 19 is selected, the neutral valve 18 is placed in its second setting-to direct the exhaust gas 2 from the engine 3 to the atmosphere, thereby making the engine resistance negligible.) Since it is desired to decelerate a reverse rotation of the drive shaft 16 of the gas-operated drive motor 15, the drive shaft 16 will then logically be rotating in its reverse direction and will, consequently, cause air to be drawn through the exhaust port 20 into the output 17 of the gas-operated drive motor 15; conduct the air through the gas-operated drive motor 15; and push the air through the input 14 of the gas-operated drive motor 15, past the second check valve 21, and into the secondary input 22 of the high-pressure reservoir 1.

Braking and the control thereof then transpire just as described for the situation when deceleration of a forward-rotating drive shaft 16 of the gas-operated drive motor 15 is desired. Again, a braking regulator is preferably inserted between the second check valve 21 and the reverse flow valve 19.

Also, preferably, a diversion valve 24 is placed between the first pressure regulator 6 and the input 11 of the variable-pressure reservoir 12. In its first setting, the diversion valve 24 directs the flow of the gas from the first pressure regulator 6 to the input 11 of the variable-pressure reservoir 12. When the Gas-based Transmission is, however, being utilized to produce a braking effect, the second setting of the diversion valve 24 conducts the flow of the gas from the first pressure regulator 6 into the input 25 of an energy storage reservoir which input 25 is attached to the diversion valve 24.

A second pressure regulator 27 is connected to an auxiliary output 28 of the energy storage reservoir 26 and is set to release gas to the atmosphere whenever pressure within the energy storage reservoir 26 exceeds the maximum pressure expected to occur within the high-pressure reservoir 1.

The high-pressure gas (now actually a mixture of the exhaust gas 2 from the engine 3 and air from the atmosphere) thereby stored in the energy storage reservoir 26 is then available, when desired, to assist the gas from the high-pressure reservoir 1 in propelling the drive shaft 16 of the gas-operated drive motor 15.

The input 29 of an energy return valve 30 is, accordingly, connected to the output 31 of the energy storage reservoir The output 32 of the energy return valve 30 is connected to a secondary input 33 of the variable-pressure reservoir 12. Preferably, however, a third check valve 34 is inserted between the output 32 of the energy return valve 30 and the secondary input 33 of the variable-pressure reservoir 12 to assure that gas can flow from the energy storage reservoir 26 to the variable-pressure reservoir 12 but not from the variable-pressure reservoir 12 to the energy storage reservoir 26.

When it is desired to assist the gas coming from the high-pressure reservoir 1 to propel the drive shaft 16 of the gas-operated drive motor 15, the energy return valve 30 is simply opened and, provided sufficient gas has then been stored, the desired assist will occur.

There is no reason for the high-pressure reservoir 1 or the variable-pressure reservoir 12 to be very large. However, the energy storage reservoir 26 is preferably relatively large because the quantity of energy that may be stored is proportional to the volume of the energy storage reservoir 26.

The term "reservoir" does not, itself, denote more than a device that can retain a gas. In some cases it may visually appear simply to be a traditionally shaped pipe; in other cases it may have the visual appearance of a traditionally shaped tank, depending on volumetric considerations.

Furthermore, any time a component is attached either to a reservoir or to a gas line which is, itself, connected to a reservoir, it is equivalent to attach such component directly to the reservoir or to any other gas line connected to such reservoir as long as no other component is between the initially considered component and the reservoir.

Returning to a consideration of the manner in which gas is compressed by the engine 3 into the high-pressure reservoir 1, a significant option exists. As shown in FIG. 5 and FIG. 7 (for the cases when the first pressure regulator 6 is controlled by the computer 8) and in FIG. 6 and FIG. 8 (for the cases when the first pressure regulator 6 is set at the one value which approximates the desired engine resistance), instead of directing the exhaust gas 2 from the engine 3 into the high-pressure reservoir 1, the engine 3 has a rotatable drive shaft 35 that is connected to the input drive shaft 36 of a compressor 37 and thereby runs the compressor 37, which is preferably the same type of simple positive-displacement pump as preferably is the gas-operated drive motor 15. When the rotatable drive shaft 35 runs the compressor 37, i.e., when the rotatable drive shaft 35 turns the input drive shaft 36 of said compressor 37, air is drawn into the input 38 of the compressor 37; conducted through the compressor 37; and pushed through the output 39 of the compressor 37, through the neutral valve 18 (only in the case of embodiments which incorporate the neutral valve 18, such as those of FIG. 7 and FIG. 8), through the first check valve 5, and into the high-pressure reservoir 1 since the input of the high-pressure reservoir 1 is attached to the first check valve 5, the first check valve 5 is connected to the neutral valve 18 (for those embodiments which incorporate a neutral valve 18) or (for those embodiments which do not have a neutral valve 18) to the output 39 of the compressor 37, and (for those embodiments which include a neutral valve 18) the neutral valve 18 is attached to the output 39 of the compressor 37. Otherwise, the embodiment FIG. 5 is constructed and operates just as does the embodiment of FIG. 1; the embodiment of FIG. 6, just as does the embodiment of FIG. 2; the embodiment of FIG. 7, just as does the embodiment of FIG. 3; and the embodiment FIG. 8, just as does the embodiment of FIG. 4.

If desired, rather than ingesting air from the atmosphere and expelling air to the atmosphere, those embodiments which incorporate the compressor 37 may have a closed gas system, generally denoted 40, as illustrated in FIG. 9 for the embodiment of FIG. 5, in FIG. 10 for the embodiment of FIG. 6, in FIG. 11 for the embodiment of FIG. 7, and in FIG. 12 for the embodiment of FIG. 8, so that the gas which exits the gas-operated drive motor 15 will be returned to the input 38 of the compressor 37.

The closed gas system 40 consists of a tube 41, the first end 42 of which tube 41 is attached to the exhaust port 20 (for those embodiments which include a reverse flow valve 19) or to the output 17 of the gas-operated drive motor 15 (for those embodiments which do not have a reverse flow valve 19) and the second end 43 of which is connected to the input 38 of the compressor 37, as demonstrated in FIG. 9, FIG. 10, FIG. 11, and FIG. 12. As also shown in these figures, an equalization reservoir 44 is inserted between the first end 42 of the tube 41 and the second end 43 of the tube 41 to adjust for the fact that the compressor 37 will not always be acquiring gas through the input 38 of the compressor 37 at the same rate as the gas-operated drive motor 15 expels gas through the exhaust port 20 (for those embodiments which include a reverse flow valve 19) or through the output 17 of the gas-operated drive motor 15 (for those embodiments which do not have a reverse flow valve 19).

A preferred construction of the equalization reservoir 44 consists, as illustrated in FIG. 13, simply of a resilient bag 45 having an input aperture 46 and an output aperture 47. A protective case 48, which is open to the atmosphere, may optionally be placed around the resilient bag 45 to prevent accidental puncturing or tearing of the resilient bag 45.

To minimize the loss of energy, all components of the Optimized Gas-based Transmission will preferably have their exterior surfaces covered with thermal insulation 49, as depicted in FIG. 14; and the cross section of all components through which gas flows will preferably have the largest practical area. Moreover, it is preferable to streamline all elements, for example, by eliminating any sharp corners within such elements, through which gas will be conducted.

An additional technique for minimizing the loss of energy is utilizing helium as the gas in the closed gas system 40. A real gas cools on expansion when passing through an orifice from an area with higher pressure to one with lower pressure. This is the Joule-Thomson effect. Similarly, when the real gas passes through an orifice from a region with lower pressure to one with higher pressure, the gas expels energy as heat. Hydrogen and helium, however, do not demonstrate this effect. The explosive nature of hydrogen, though, reduces its desirability.

Also, it should be recognized that any valve which has been discussed above and which has multiple settings could equivalently be replaced with several valves each of which have only one setting.

Finally, although not discussed above, any two elements which are connected to one another in order to exchange gas could either be attached directly to one another or connected with a duct.

I claim:

1. An optimized gas-based transmission, which comprises:

a compressor having an input drive shaft that is connected to a rotatable drive shaft of an engine such that when the rotatable drive shaft turns the input drive shaft of said compressor, air is drawn into the input of the compressor, conducted through the compressor, and pushed through the output of the compressor;

a high-pressure reservoir, the input of which high-pressure reservoir is connected to the output of the compressor so that when the rotatable drive shaft turns the input drive shaft of the compressor, the air from the output of the compressor is forced into the input of the high-pressure reservoir;

a first pressure regulator, the input of which first pressure regulator is attached to the output of the high-pressure reservoir;

a variable-pressure reservoir, the input of which variable-pressure reservoir is attached to the output of the first pressure regulator to receive the air from the high-pressure reservoir when the first pressure regulator permits such gas to flow from its input to its output; and a gas-operated drive motor, the input of which gas-operated drive motor is connected to the output of the variable-pressure reservoir so that when sufficient pressure exists within the variable-pressure reservoir, the air will enter the input of the gas-operated drive motor, cause the drive shaft of the gas-operated drive motor to rotate, and exit the gas-operated drive motor through the output of the gas-operated drive motor.

2. An optimized gas-based transmission, which comprises:

a compressor having an input drive shaft that is connected to a rotatable drive shaft of an engine such that when the rotatable drive shaft turns the input drive shaft of said compressor, air is drawn into the input of the compressor, conducted through the compressor, and pushed through the output of the compressor;

a high-pressure reservoir, the input of which high-pressure reservoir is connected to the output of the compressor so that when the rotatable drive shaft turns the input drive shaft of the compressor, the air from the output of the compressor is forced into the input of the high-pressure reservoir;

a first pressure regulator, the input of which first pressure regulator is attached to the output of the high-pressure reservoir;

a variable-pressure reservoir, the input of which variable-pressure reservoir is attached to the output of the first pressure regulator to receive the air from the high-pressure reservoir when the first pressure regulator permits such gas to flow from its input to its output;

a gas-operated drive motor, the input of which gas-operated drive motor is connected to the output of the variable-pressure reservoir so that when sufficient pressure exists within the variable-pressure reservoir, the air will enter the input of the gas-operated drive motor, cause the drive shaft of the gas-operated drive motor to rotate, and exit the gas-operated drive motor through the output of the gas-operated drive motor;

a throttle sensor that measures a throttle setting for the engine; and a computer, having in its memory a desired engine power that corresponds to any given throttle setting as well as a power curve for the engine, said computer being connected to the first pressure regulator and also to the throttle sensor permitting said computer to determine, and direct the first pressure regulator to adjust, the pressure within the high-pressure reservoir to achieve a lowest engine speed which can produce the desired engine power.

3. The optimized gas-based transmission as recited in claim 2, further comprising:

a speed sensor connected to both the engine and the computer in order to provide the computer with the actual speed of the engine in order to permit the computer to verify that the appropriate engine speed has been achieved and to enable the computer to direct the first pressure regulator to make any corrections to the pressure within the high-pressure reservoir necessary to achieve the lowest engine speed which can produce the desired engine power.

4. The optimized gas-based transmission as recited in claim 2, further comprising:

a tube, a first end of which tube is attached to the output of the gas-operated drive motor and a second end of which tube is connected to the input of the compressor so that the gas which exits the gas-operated drive motor will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

5. The optimized gas-based transmission as recited in claim 2, further comprising:

a neutral valve connected to the output of the compressor and to the input of the high-pressure reservoir, said neutral valve having a first setting in which said neutral valve conveys the gas from the output of the compressor to the input of the high-pressure reservoir and a second setting in which said neutral valve directs the gas from the engine to the atmosphere and closes the input of the high-pressure reservoir.

6. The optimized gas-based transmission as recited in claim 5, further comprising:

a tube, a first end of which tube is attached to the output of the gas-operated drive motor and a second end of which tube is connected to the input of the compressor so that the gas which exits the gas-operated drive motor will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

7. The optimized gas-based transmission as recited in claim 5, further comprising:

an exhaust port; and a reverse flow valve connected to the exhaust port, to the output of the variable-pressure reservoir, and to both the input and the output of the gas-operated drive motor, said reverse flow valve having a first setting in which said reverse flow valve directs the gas from the output of the variable-pressure reservoir to the input of the gas-operated drive motor and vents the output of the gas-operated drive motor through an exhaust port to the atmosphere so that the drive shaft of the gas-operated drive motor rotates in a direction defined as the forward direction of rotation for the drive shaft of the gas-operated drive motor, and said reverse flow valve having a second setting in which said reverse flow valve conducts the gas from the output of the variable-pressure reservoir to the output of the gas-operated drive motor and vents the input of the gas-operated drive motor through the exhaust port to the atmosphere so that the gas flows through the gas-operated in a direction opposite to that when the reverse flow valve is in its first setting, thereby causing the drive shaft of the gas-operated drive motor to rotate in the reverse direction of rotation for the drive shaft of the gas-operated drive motor.

8. The optimized gas-based transmission as recited in claim 7, further comprising:

a tube, a first end of which tube is attached to the exhaust port and a second end of which tube is connected to the input of the compressor so that the gas which exits the exhaust port will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

9. The optimized gas-based transmission as recited in claim 2, further comprising:

an exhaust port; and a reverse flow valve connected to the exhaust port, to the output of the variable-pressure reservoir, and to both the input and the output of the gas-operated drive motor, said reverse flow valve having a first setting in which said reverse flow valve directs the gas from the output of the variable-pressure reservoir to the input of the gas-operated drive motor and vents the output of the gas-operated drive motor through an exhaust port to the atmosphere so that the drive shaft of the gas-operated drive motor rotates in a direction defined as the forward direction of rotation for the drive shaft of the gas-operated drive motor, and said reverse flow valve having a second setting in which said reverse flow valve conducts the gas from the output of the variable-pressure reservoir to the output of the gas-operated drive motor and vents the input of the gas-operated drive motor through the exhaust port to the atmosphere so that the gas flows through the gas-operated in a direction opposite to that when the reverse flow valve is in its first setting, thereby causing the drive shaft of the gas-operated drive motor to rotate in the reverse direction of rotation for the drive shaft of the gas-operated drive motor.

10. The optimized gas-based transmission as recited in claim 9, further comprising:

a tube, a first end of which tube is attached to the exhaust port and a second end of which tube is connected to the input of the compressor so that the gas which exits the exhaust port will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

11. An optimized gas-based transmission, which comprises:

a compressor having an input drive shaft that is connected to a rotatable drive shaft of an engine such that when the rotatable drive shaft turns the input drive shaft of said compressor, air is drawn into the input of the compressor, conducted through the compressor, and pushed through the output of the compressor;

a high-pressure reservoir, the input of which high-pressure reservoir is connected to the output of the compressor so that when the rotatable drive shaft turns the input drive shaft of the compressor, the air from the output of the compressor is forced into the input of the high-pressure reservoir;

a first pressure regulator, the input of which first pressure regulator is attached to the output of the high-pressure reservoir and which first pressure regulator is set to maintain one appropriate value for pressure in the high-pressure reservoir that creates an approximate linear relationship which exists between engine power and engine speed in the power curve for the engine between a first point of minimum engine power and a point of maximum engine power;

a variable-pressure reservoir, the input of which variable-pressure reservoir is attached to the output of the first pressure regulator to receive the air from the high-pressure reservoir when the first pressure regulator permits such gas to flow from its input to its output; and a gas-operated drive motor, the input of which gas-operated drive motor is connected to the output of the variable-pressure reservoir so that when sufficient pressure exists within the variable-pressure reservoir, the air will enter the input of the gas-operated drive motor, cause the drive shaft of the gas-operated drive motor to rotate, and exit the gas-operated drive motor through the output of the gas-operated drive motor.

12. The optimized gas-based transmission as recited in claim 11, further comprising:

a tube, a first end of which tube is attached to the output of the gas-operated drive motor and a second end of which tube is connected to the input of the compressor so that the gas which exits the gas-operated drive motor will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

13. The optimized gas-based transmission as recited in claim 11, further comprising:

a neutral valve connected to the output of the compressor and to the input of the high-pressure reservoir, said neutral valve having a first setting in which said neutral valve conveys the gas from the output of the compressor to the input of the high-pressure reservoir and a second setting in which said neutral valve directs the gas from the engine to the atmosphere and closes the input of the high-pressure reservoir.

14. The optimized gas-based transmission as recited in claim 13, further comprising:

a tube, a first end of which tube is attached to the output of the gas-operated drive motor and a second end of which tube is connected to the input of the compressor so that the gas which exits the gas-operated drive motor will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

15. The optimized gas-based transmission as recited in claim 13, further comprising:

an exhaust port; and a reverse flow valve connected to the exhaust port, to the output of the variable-pressure reservoir, and to both the input and the output of the gas-operated drive motor, said reverse flow valve having a first setting in which said reverse flow valve directs the gas from the output of the variable-pressure reservoir to the input of the gas-operated drive motor and vents the output of the gas-operated drive motor through an exhaust port to the atmosphere so that the drive shaft of the gas-operated drive motor rotates in a direction defined as the forward direction of rotation for the drive shaft of the gas-operated drive motor, and said reverse flow valve having a second setting in which said reverse flow valve conducts the gas from the output of the variable-pressure reservoir to the output of the gas-operated drive motor and vents the input of the gas-operated drive motor through the exhaust port to the atmosphere so that the gas flows through the gas-operated in a direction opposite to that when the reverse flow valve is in its first setting, thereby causing the drive shaft of the gas-operated drive motor to rotate in the reverse direction of rotation for the drive shaft of the gas-operated drive motor.

16. The optimized gas-based transmission as recited in claim 15, further comprising:

a tube, a first end of which tube is attached to the exhaust port and a second end of which tube is connected to the input of the compressor so that the gas which exits the exhaust port will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

17. The optimized gas-based transmission as recited in claim 11, further comprising:

an exhaust port; and a reverse flow valve connected to the exhaust port, to the output of the variable-pressure reservoir, and to both the input and the output of the gas-operated drive motor, said reverse flow valve having a first setting in which said reverse flow valve directs the gas from the output of the variable-pressure reservoir to the input of the gas-operated drive motor and vents the output of the gas-operated drive motor through an exhaust port to the atmosphere so that the drive shaft of the gas-operated drive motor rotates in a direction defined as the forward direction of rotation for the drive shaft of the gas-operated drive motor, and said reverse flow valve having a second setting in which said reverse flow valve conducts the gas from the output of the variable-pressure reservoir to the output of the gas-operated drive motor and vents the input of the gas-operated drive motor through the exhaust port to the atmosphere so that the gas flows through the gas-operated in a direction opposite to that when the reverse flow valve is in its first setting, thereby causing the drive shaft of the gas-operated drive motor to rotate in the reverse direction of rotation for the drive shaft of the gas-operated drive motor.

18. The optimized gas-based transmission as recited in claim 17, further comprising:

a tube, a first end of which tube is attached to the exhaust port and a second end of which tube is connected to the input of the compressor so that the gas which exits the exhaust port will be returned to the input of the compressor; and an equalization reservoir inserted between the first end of the tube and the second end of the tube to adjust for the fact that the compressor will not always be acquiring gas through the input of the compressor at the same rate as the gas-operated drive motor expels gas.

19. A process for transmitting power from an engine that has a rotatable drive shaft, which comprises:

having an input drive shaft of a compressor connected to the rotatable drive shaft of the engine so that when the rotatable drive shaft rotates, it turns the input drive shaft of the compressor causing air to be drawn into the input of the compressor, conducted through the compressor, and pushed through the output of the compressor;

receiving into the input of a high-pressure reservoir, the input of which high-pressure reservoir is connected to the output of the compressor, the air from the output of the compressor when the rotatable drive shaft of the engine turns the input drive shaft of the compressor;

using a first pressure regulator to control the passage of gas from the output of the high-pressure reservoir to the input of a variable-pressure reservoir;

receiving into the variable-pressure reservoir gas from the high-pressure reservoir when the first pressure regulator permits such gas to flow from the output of said first pressure regulator; and receiving into the input of a gas-operated drive motor the gas from the output of the variable-pressure reservoir when sufficient pressure exists within the variable-pressure reservoir to force the gas to enter the input of the gas-operated drive motor, to have such gas rotate the drive shaft of the gas-operated drive motor, and to have such gas then exit the gas-operated drive motor through the output of the gas-operated drive motor.

* * * * *